US010717370B2

United States Patent
Hisamatsu et al.

(10) Patent No.: US 10,717,370 B2
(45) Date of Patent: Jul. 21, 2020

(54) VEHICLE SEAT CORE MEMBER

(71) Applicant: JSP CORPORATION, Tokyo (JP)

(72) Inventors: Katsunori Hisamatsu, Utsunomiya (JP); Atsuo Takayama, Kanuma (JP); Keiichi Hashimoto, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 80 days.

(21) Appl. No.: 16/067,645

(22) PCT Filed: Feb. 3, 2017

(86) PCT No.: PCT/JP2017/004120
§ 371 (c)(1),
(2) Date: Jul. 2, 2018

(87) PCT Pub. No.: WO2017/135456
PCT Pub. Date: Aug. 10, 2017

(65) Prior Publication Data
US 2019/0014907 A1    Jan. 17, 2019

(30) Foreign Application Priority Data

Feb. 4, 2016 (JP) .................. 2016-020035

(51) Int. Cl.
*B32B 1/02* (2006.01)
*B60N 2/005* (2006.01)
(Continued)

(52) U.S. Cl.
CPC ............... *B60N 2/005* (2013.01); *A47C 7/00* (2013.01); *A47C 7/029* (2018.08); *A47C 7/16* (2013.01);
(Continued)

(58) Field of Classification Search
CPC .. A47C 7/02; A47C 7/029; A47C 7/16; A47C 7/20; A47C 7/00; B60N 2/005; B60N 2/68; B32B 1/02
See application file for complete search history.

(56) References Cited

U.S. PATENT DOCUMENTS

2011/0018329 A1* 1/2011 Galbreath .............. B60N 2/012
297/452.18
2012/0115968 A1* 5/2012 Shima .................... C08J 9/0061
521/59

FOREIGN PATENT DOCUMENTS

JP    H07-137063 A    5/1995
JP    H08-103581 A    4/1996
(Continued)

OTHER PUBLICATIONS

Aug. 16, 2018 International Preliminary Report on Patentability issued in International Patent Application No. PCT/JP2017/004120.
(Continued)

*Primary Examiner* — Walter Aughenbaugh
(74) *Attorney, Agent, or Firm* — Oliff PLC

(57) ABSTRACT

There is provided a vehicle seat core member that is superior in terms of a dimensional accuracy as well as integrity of a thermoplastic resin expanded beads molded body and a frame member. A vehicle seat core member (100) is formed as an integrally molded article of a thermoplastic resin expanded beads molded body (10) and a frame member (20), the thermoplastic resin expanded beads molded body (10) is formed of thermoplastic resin expanded beads (30) having through holes (32), and a porosity of the thermoplastic resin expanded beads molded body (10) is 10 vol % or more and 40 vol % or less.

10 Claims, 4 Drawing Sheets

(51) Int. Cl.
*B60N 2/90* (2018.01)
*B29C 67/20* (2006.01)
*B60N 2/70* (2006.01)
*B29C 44/44* (2006.01)
*C08J 9/232* (2006.01)
*B60N 2/68* (2006.01)
*A47C 7/00* (2006.01)
*A47C 7/02* (2006.01)
*A47C 7/16* (2006.01)
*A47C 7/20* (2006.01)
*A47C 27/14* (2006.01)
*B29L 31/00* (2006.01)
*B29K 105/04* (2006.01)

(52) U.S. Cl.
CPC .............. *A47C 7/20* (2013.01); *A47C 27/144* (2013.01); *B29C 44/445* (2013.01); *B29C 67/205* (2013.01); *B32B 1/02* (2013.01); *B60N 2/68* (2013.01); *B60N 2/7017* (2013.01); *B60N 2/90* (2018.02); *C08J 9/232* (2013.01); *B29K 2105/048* (2013.01); *B29L 2031/771* (2013.01); *B32B 2266/0292* (2013.01); *C08J 2323/02* (2013.01)

(56) References Cited

FOREIGN PATENT DOCUMENTS

| | | |
|---|---|---|
| JP | 2004-068016 A | 3/2004 |
| JP | 3616410 B2 | 2/2005 |
| JP | 2011-016458 A | 1/2011 |
| JP | 2012-102201 A | 5/2012 |
| JP | 2015-136851 A | 7/2015 |
| JP | 2015-155146 A | 8/2015 |

OTHER PUBLICATIONS

Aug. 30, 2019 Search Report issued in European Patent Application No. EP 17747607.

May 16, 2017 International Search Report issued in International Patent Application No. PCT/JP2017/004120.

* cited by examiner

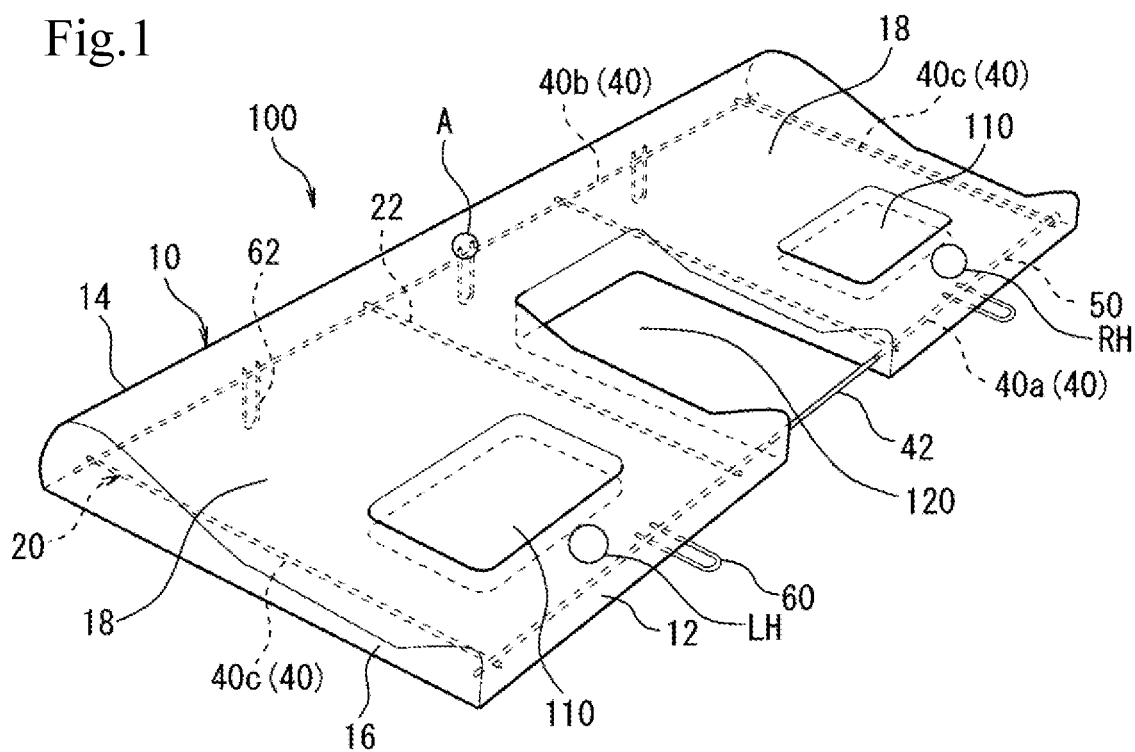

VEHICLE SEAT CORE MEMBER

TECHNICAL FIELD

The present invention relates to a vehicle seat core member.

BACKGROUND ART

In recent years, as a seat core member for a vehicle such as an automobile (hereinafter also referred to as seat core member), a seat core member formed in such a manner that a frame member made of metal or the like is disposed in a thermoplastic resin expanded beads molded body (hereinafter also referred to as expanded beads molded body) has been used. The frame member may be provided with a latch part for fixedly attaching a seat to a vehicle body.

Patent Literature 1 discloses an example of such a member that includes the expanded beads molded body, the frame member, and the like (seat core member). In Patent Literature 1, there is proposed a member in which a frame member for reinforcing a cushion material is attached to an expanded beads molded body, and a member in which a frame member is attached to an expanded beads molded body with a part of the frame member embedded in the expanded beads molded body (hereinafter also referred to as conventional art 1).

CITATION LIST

Patent Literature

Patent Literature 1: JP 2011-016458 A

SUMMARY OF INVENTION

Technical Problem

The member in which the frame member is attached to the expanded beads molded body by post processing, which is disclosed in conventional art 1, lacks integrity of the expanded beads molded body and the frame member.

Meanwhile, integrity of the expanded beads molded body and the frame member can be enhanced when a method of in-mold molding, in which a mold for molding an expanded beads molded body therein is filled with expanded beads while the frame member is disposed in the mold (hereinafter referred to as insert molding), is employed. However, in the conventional insert molding described above, there has been a problem that the seat core member curves after molding due to a difference in a molding shrinkage ratio between the expanded beads molded body and the frame member, thereby causing a dimensional error.

Specifically, as a frame member, a material having a molding shrinkage ratio that is lower than that of the expanded beads molded body is commonly used. However, when the frame member is embedded in the expanded beads molded body and formed integrally therewith, the frame member curves at times due to an external force exerted by a molding shrinkage of the expanded beads molded body after the insert molding. Accordingly, there has been a problem that the seat core member itself curves, thereby lowering a dimensional accuracy of the seat core member.

In particular, in an aspect of the seat core member where an annular frame member is provided along an outer edge of the expanded beads molded body, the seat core member largely curves after the molding due to the molding shrinkage of the expanded beads molded body. Accordingly, in the aspect described above, there has been a problem that the seat core member can be difficult to dispose at a predetermined position of the vehicle, or that the latch part provided on the frame member is displaced from an intended position, whereby the seat core member can be difficult to latch at a predetermined position of the vehicle.

The present invention has been conceived to solve the problems described above. That is, according to the present invention, there is provided a vehicle seat core member that is superior in terms of a dimensional accuracy as well as integrity of an expanded beads molded body and a frame member.

Solution to Problem

A vehicle seat core member according to the present invention is a vehicle seat core member that is an integrally molded article of a thermoplastic resin expanded beads molded body and a frame member. The thermoplastic resin expanded beads molded body is an expanded beads molded body in which thermoplastic resin expanded beads having through holes are mutually fused, and includes voids therein. A porosity of the thermoplastic resin expanded beads molded body is 10 vol % or more and 40 vol % or less.

Advantageous Effects of Invention

The vehicle seat core member according to the present invention is the integrally molded article of the expanded beads molded body, which includes voids therein and formed in such a manner that expanded beads having through holes are mutually fused, and the frame member. Accordingly, the seat core member according to the present invention is superior in terms of, as well as the integrity of both components (i.e. expanded beads molded body and frame member), the dimensional accuracy since a curvature of the frame member induced by the shrinkage of the expanded beads molded body after the molding is inhibited.

BRIEF DESCRIPTION OF DRAWINGS

FIG. 1 is a schematic perspective view of a vehicle seat core member according to a first embodiment of the present invention.

DESCRIPTION OF EMBODIMENTS

First Embodiment

Figure 2A:
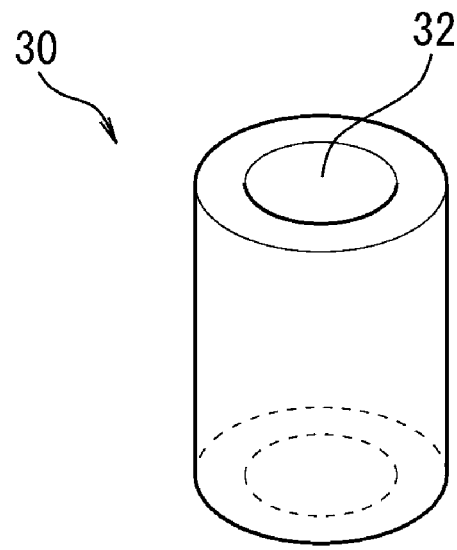
FIGS. 2A and 2B are perspective views of examples of thermoplastic resin expanded beads having through holes, which are used in the present invention.
Figure 2B:
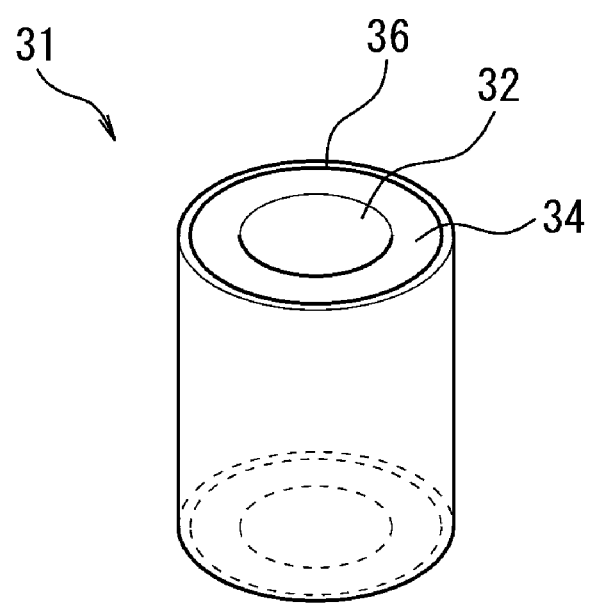
Figure 3A:
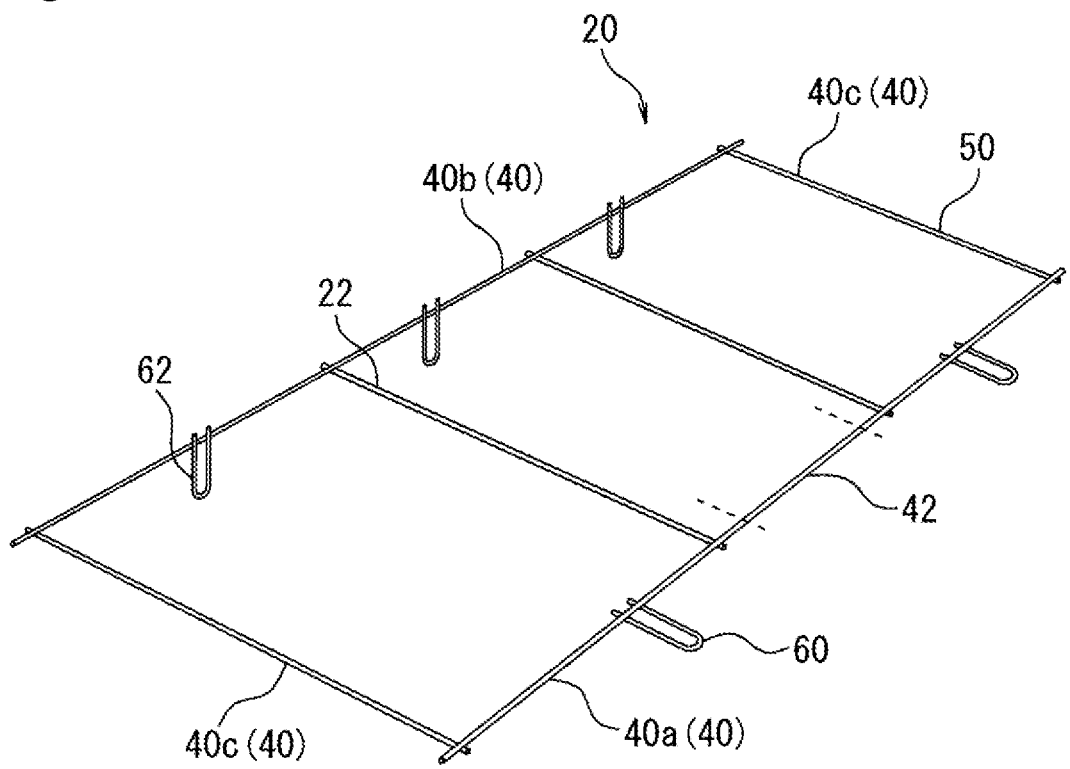
FIG. 3A is a schematic perspective view of a frame member used in the vehicle seat core member illustrated in FIG. 1.
Figure 3B:
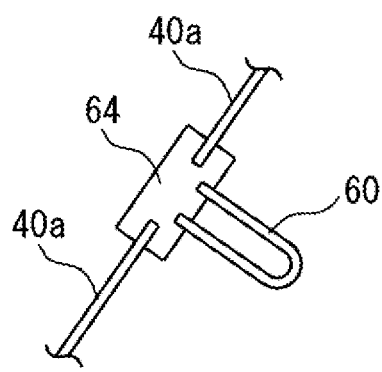
FIG. 3B is a partial schematic plan view of a variation of the frame member illustrated in FIG. 3A.

Hereinafter, a vehicle seat core member according to a first embodiment of the present invention will be described with reference to FIGS. 1 to 3B. FIG. 1 is a schematic perspective view of a vehicle seat core member 100 (hereinafter also simply referred to as seat core member 100) according to the first embodiment of the present invention. FIG. 2A is a perspective view of an example of a thermoplastic resin expanded bead 30 (hereinafter also simply referred to as expanded bead 30) having a through hole 32, which is used in the present invention. FIG. 2B is a perspective view of an example of another expanded bead (multilayer expanded bead 31), which is used in the present invention. FIG. 3A is a schematic perspective view of a frame member 20 used in the seat core member 100 illustrated in FIG. 1. FIG. 3B is a partial schematic perspective view of a variation of the frame member 20 illustrated in FIG. 3A.

Note that preferable numerical ranges of the present invention may be appropriately indicated in the following descriptions. Here, a preferable range, a more preferable range, and a particularly preferable range with regard to an upper limit and a lower limit of the numerical range can be determined from all combinations of the upper limits and the lower limits. In addition, unless otherwise specified in the descriptions, a front-rear direction, a left-right direction, and an up-down direction of the seat core member correspond to a front-rear direction, a left-right direction, and an up-down direction of a vehicle in a state where the seat core member is installed in the vehicle, respectively. Moreover, in the descriptions, the term "shrinkage" without particular notice indicates a molding shrinkage that occurs after molding of the expanded beads molded body.

As illustrated in FIG. 1, the seat core member 100 according to the present invention is an integrally molded article of a thermoplastic resin expanded beads molded body 10 (hereinafter also simply referred to as expanded beads molded body 10) and the frame member 20. The expanded beads molded body 10 is an expanded beads molded body in which the expanded beads 30 (see FIG. 2A) having through holes 32 are mutually fused, and includes voids therein. The expanded beads molded body 10 included in the seat core member 100 is adjusted such that a porosity thereof becomes 10 vol % or more and 40 vol % or less.

In the seat core member 100 configured as described above, the expanded beads 30 having through holes 32 are used, whereby a predetermined range of voids can be provided throughout the molded body without impairing mechanical strength of the expanded beads molded body 10. The present inventors have found out that the presence of such voids inhibits a curvature of the seat core member 100 induced by a molding shrinkage of the expanded beads molded body 10, whereby a dimensional accuracy of the seat core member 100 can be improved.

The seat core member 100 is the integrally molded article of the expanded beads molded body 10 and the frame member 20, which is produced by the insert molding described above. More specifically, the seat core member 100 can be produced by way of in-mold molding in which a mold for molding the expanded beads molded body 10 therein is filled with the expanded beads 30 while the frame member 20 is disposed in the mold. Since the frame member is embedded in the expanded beads molded body, the seat core member 100 can be superior in terms of integrity of both components (i.e. expanded beads molded body 10 and frame member 20). The frame member 20 may include a bent part, a curved part, an intersecting part, or the like in a range where such parts can be disposed inside the above-described mold for molding the expanded beads molded body. According to the present invention, the seat core member 100 with a high dimensional accuracy can be easily produced by following commonly used methods of manufacturing an expanded beads molded body such as a method of cracking molding or a method of pressurization molding.

In the present embodiment, the integrally molded article indicates the article in which the frame member 20 is embedded into the expanded beads molded body 10 at a time of in-mold molding of the expanded beads molded body 10 so that both components are integrated. The integrally molded article described above is distinguished from a product manufactured in such a manner that, for example, a frame member is attached to a pre-molded expanded beads molded body.

The porosity of the expanded beads molded body 10 is 10 vol % or more and 40 vol % or less. When the porosity is too low, an inhibitory effect of the curvature of the frame member 20 induced by the molding shrinkage of the expanded beads molded body 10 may not be exerted. In view of the above, the lower limit of the predetermined range of the porosity is preferably 12 vol % or more, more preferably 14 vol % or more, and particularly preferably 16 vol % or more. Besides, when the porosity is too high, the mechanical strength of the seat core member may be insufficient. In view of the above, the upper limit of the predetermined range of the porosity is preferably 35 vol % or less, and more preferably 30 vol % or less.

The voids formed in the expanded beads molded body 10 include voids existing among the expanded beads forming the expanded beads molded body 10, and voids formed as through holes or the like in the expanded beads themselves.

The porosity of the expanded beads molded body 10 according to the present embodiment is calculated as a volume ratio (vol %) from a volume H calculated from an outer dimension of the expanded beads molded body 10 and a volume I ($cm^3$) of the expanded beads molded body 10 excluding void portions thereof, using the following (Formula 1).

(Expression 1)

$$\text{Porosity (vol \%)} = [(H-I)/H] \times 100 \quad \text{(Formula 1)}$$

Specifically, it can be measured as follows.

Ten or more object spots to be measured are randomly selected from the expanded beads molded body 10 after the molding shrinkage has ceased, and a rectangular parallelepiped cut sample having dimensions of 25 mm×25 mm×100 mm is cut out from each object spot to be measured. The cut sample is cut out in such a manner that a skin surface is not included therein. For each of the cut samples, the volume H ($cm^3$) is calculated from the outer dimension of the cut sample, and also the volume I ($cm^3$) excluding void portions of the cut sample is measured. The volume I can be calculated by subtracting, in a state where the cut sample is immersed in alcohol, the volume of the alcohol before the cut sample is immersed therein from the total volume of the alcohol and the cut sample immersed therein. Here, examples of the alcohol include ethyl alcohol. Then, the porosity is calculated as the volume ratio using above-mentioned (Formula 1) on the basis of the values of the volume H and the volume I. The values of the porosities calculated for respective cut samples are arithmetically averaged, thereby defining the porosity (vol %).

Hereinafter, embodiments of the vehicle seat core member 100 according to the present invention will be described in detail.

FIG. 1 is an example of the seat core member 100. The seat core member 100 is configured in such a manner that the frame member 20 is embedded in the expanded beads molded body 10. The seat core member 100 is installed at an area to be a seat of an automobile. In general, a vehicle seat is formed in such a manner that a cushion material such as a urethane foam is laminated on an upper surface of the seat core member 100, and a fabric made of cloth or leather is applied to coat the surface thereafter. The expanded beads molded body 10 according to the present embodiment includes, corresponding to a design of the automobile seat, thick regions in the vicinities of a rear end 12 and a front end 14. In each of these thick regions, a part of the frame member 20 is embedded and extended in the left-right direction. A thickness of the expanded beads molded body 10 is minimized at a middle part 16 between the rear end 12 and the front end 14.

The expanded beads molded body 10 according to the present embodiment includes seat sections 18 at respective left and right sides of a recess 120. The recess 120 is a recessed space in a plan view where the expanded beads molded body 10 is not included, which is formed from the side of the rear end 12 toward the side of the front end 14. A hole 110 is provided at a central region of the seat section 18 and penetrates in the up-down direction. The recess 120 and the hole 110 can be appropriately designed corresponding to a structure of a vehicle in which the seat core member is installed.

The expanded beads molded body 10 includes the expanded beads 30 (see FIG. 2A) having through holes 32. Examples of the thermoplastic resin for forming the expanded bead 30 include a polystyrene-based resin, a polyolefin-based resin such as a polyethylene, or polypropylene, a polyester-based resin such as polybutylene succinate, polyethylene terephthalate, or polylactic acid, and a polycarbonate-based resin. Further, a composite resin of a polystyrene-based resin and a polyolefin-based resin, or a mixture of two or more above-mentioned resins, for example, can be used as the thermoplastic resin.

A thermoplastic resin for forming the expanded bead 30 (i.e. thermoplastic resin for forming the expanded beads molded body 10) is preferably a thermoplastic resin that includes a crystalline resin such as a polyolefin-based resin, or a composite resin of a polyolefin-based resin and a polystyrene-based resin. As the polyolefin-based resin mentioned above, a polyethylene-based resin or a polypropylene-based resin is preferable. In particular, the polypropylene-based resin is more preferable in view of strength and impact resistance. Examples of the polypropylene-based resin include a propylene homopolymer, a copolymer of propylene and another comonomer, and a mixture thereof. Examples of the copolymer of the propylene and another comonomer include a propylene-ethylene copolymer, a propylene-butene copolymer, and a propylene-ethylene-butene copolymer. With regard to such propylene-based resins, a preferable propylene component unit in the resin is approximately 50 mass % or more, more preferably 80 mass % or more, and particularly preferably 90 mass % or more.

The expanded beads molded body 10 formed of the expanded beads 30 containing the crystalline resin such as the polyolefin-based resin has a higher shrinkage ratio than that of a case where an amorphous resin is contained. In contrast, according to the seat core member 100 formed of the expanded beads 30 having through holes 32, which has a predetermined porosity, the curvature of the frame part 20 is effectively inhibited even when the crystalline resin is used.

The expanded bead 30 is formed in such a manner that the through hole 32 is provided therein. The expanded bead 30 according to the present embodiment is provided with the through hole 32 having a circular cross-section, and is cylindrically shaped. Note that this does not limit the shape of the expanded bead 30. For example, the expanded bead 30 may be in a shape of a cylindrical column, an elliptical column, or a prismatic column, and is provided with at least a through hole penetrating the column.

In the expanded beads molded body in which the expanded beads having through holes are mutually fused, the through holes in the expanded beads forming the expanded beads molded body serve as voids. Accordingly, with regard to the expanded beads molded body, the voids are homogeneously provided throughout the molded body. With this configuration, it is believed that influence of the molding shrinkage can be effectively reduced without largely impairing mechanical strength of the expanded beads molded body.

A diameter of the through hole 32 of the expanded bead 30 observed in the expanded beads molded body 10 is preferably 1 mm or more and 7 mm or less. When the diameter of the through hole 32 is measured, first, 50 or more cross-sectional areas of the through holes 32 in the expanded beads 30, which are observed in a cross-sectional photograph of the expanded beads molded body 10, are measured. Then, each of the measured cross-sectional areas is converted into a diameter of a circle having the same area as the measured cross-sectional area, whereby the diameter of the through hole 32 can be calculated by arithmetically averaging the converted diameters. When the diameter of the through hole 32 is within the range mentioned above, voids in the expanded beads molded body 10 can be easily adjusted to the predetermined range. From this point of view, the diameter of the through hole 32 is more preferably 1 mm or more and 5 mm or less.

Moreover, although the expanded bead 30 is substantially single-layered, the expanded bead 30 is not limited thereto, and may be multi-layered. A resin for forming each layer of the multilayer expanded bead 31 having a multilayer structure may be the resin of the same type with one another or the resins different from one another. For example, a two-layered expanded bead like the multilayer expanded bead 31 illustrated in FIG. 2B can be employed.

As illustrated in FIG. 2B, the multilayer expanded bead 31 having the through hole 32 is preferably multi-layered by a tubular thermoplastic resin foamed core layer 34 (hereinafter also simply referred to as core layer 34) and a thermoplastic resin coating layer 36 that coats the core layer 34 (hereinafter also simply referred to as coating layer 36). Although the illustrated multilayer expanded bead 31 is two-layered, an intermediate layer may further be provided optionally between the core layer 34 and the coating layer 36.

Whereas the core layer 34 of the multilayer expanded bead 31 is a foamed layer formed of a resin in a foamed state, the coating layer 36 of the multilayer expanded bead 31 may be a resin layer formed of a resin in substantially a non-foamed state. Here, substantially a non-foamed state includes, in addition to a state where the coating layer 36 includes no foam (including a state where foam, once formed at a time of foaming the expanded beads, is molten and destroyed such that the foam is removed), a state where only a little amount of extremely minute foam exists.

The resin for forming the core layer 34 and the resin for forming the coating layer 36 are not particularly limited as long as they are the thermoplastic resins. However, the respective resins are preferably different from each other in melting temperatures. In particular, a melting temperature of the resin for forming the coating layer 36 of the multilayer expanded bead 31 is preferably lower than that of the resin for forming the core layer 34. Further, a melting temperature Ts (° C.) of the resin for forming the coating layer 36 is preferably lower than a melting temperature Tc (° C.) of the resin for forming the core layer 34 by at least 15° C. (Tc−15≥Ts), and the melting temperature Ts (° C.) of the resin for forming the coating layer 36 is more preferably lower than the melting temperature Tc (° C.) of the resin for forming the core layer 34 by at least 30° C. (Tc−30≥Ts). With the difference in the melting temperature between the resin for forming the coating layer 36 and the resin for forming the core layer 34 being set in the above-mentioned range, the expanded beads molded body in a rigidly fused state can be produced even when the in-mold molding is carried out at low vapor pressure for molding. In addition, since the in-mold molding at the low vapor pressure for molding is enabled, the shrinkage of the expanded beads molded body induced by the in-mold molding can be further inhibited. Incidentally, the more the difference in the melting temperature between Ts and Tc (Tc−Ts) is increased, the more the temperature at which expanded beads can be mutually fused can be lowered, whereby the vapor pressure for molding at the time of the in-mold molding can be further lowered.

A preferable difference in the melting temperature between Ts and Tc (Tc−Ts) is approximately 70° C. or less (Tc−70 Ts), and more preferably 60° C. or less (Tc−60≤Ts).

As a resin base material for the core layer 34 and the coating layer 36, the resin similar to that used in the above-described expanded bead 30 can be used. In particular, the core layer 34 is preferably a polyolefin-based resin and the coating layer 36 is preferably the polyolefin-based resin; more preferably, the core layer 34 is a polypropylene-based resin and the coating layer 36 is the polypropylene-based resin or a polyethylene-based resin; and particularly preferably, the core layer 34 is the polypropylene-based resin and the coating layer 36 is the polyethylene-based resin.

With regard to the polyethylene-based resin for forming the coating layer, a preferable ethylene component unit in the resin is approximately 50 mass % or more, further preferably 70 mass % or more, still further preferably 80 mass % or more, and particularly preferably 90 mass % or more.

As the polyethylene-based resin, a homopolymer of the ethylene or a copolymer of the ethylene and an α-olefin having 3 to 6 carbon atoms is preferable. More specifically, examples thereof include high density polyethylene, low density polyethylene, linear low density polyethylene, ultralow density polyethylene, and a mixed resin of two or more of these.

One of preferable aspects of the present invention is a case where the expanded bead used for the present embodiment is the multilayer expanded bead 31 that includes the core layer 34 and the coating layer 36 coating the core layer 34, and the melting temperature of the resin for forming the coating layer 36 is lower than that of the resin for forming the core layer 34. According to such an aspect, at the time of the in-mold molding of the expanded beads molded body 10, the coating layer 36 is melted prior to the core layer 34, whereby the expanded beads molded body 10 in which voids formed by the through holes 32 are maintained can be molded while the multilayer expanded beads 31 are mutually fused more surely. Therefore, the porosity of the expanded beads molded body 10 can be easily controlled within the predetermined range, whereby the dimensional accuracy of the seat core member 100 can be further improved.

A preferable melting temperature of the core layer 34 for forming the multilayer expanded bead 31 is approximately 120° C. or more and 165° C. or less, further preferably 130° C. or more and 165° C. or less, still further preferably 140° C. or more and 165° C. or less, and particularly preferably 145° C. or more and 165° C. or less. In contrast, a preferable melting temperature of the coating layer 36 is approximately 90° C. or more and 130° C. or less, and more preferably 95° C. or more and 125° C. or less.

The above-described melting temperature of the resin is a value measured in accordance with "a case of measuring a melting temperature after performing a certain heat treatment" described in JIS K7121 (1987). Here, both a heating rate and a cooling rate in conditioning of a test piece are 10° C./min. When the test piece is heated by a DSC apparatus at the heating rate of 10° C./min to obtain a DSC curve, a peak temperature of an endothermic peak based on melting of the resin on the DSC curve is defined as the melting temperature value. When a plurality of endothermic peaks is present on the DSC curve, a vertex of the endothermic peak having the largest endothermic peak area is defined as the melting temperature. As a measuring apparatus, for example, DSC Q1000 manufactured by TA Instruments can be used.

In the aspect described above, a mass ratio between the core layer 34 and the coating layer 36 is not particularly limited according to the present embodiment. For example, in the aspect where the melting temperatures of the core layer 34 and the coating layer 36 are different as described above, it is preferable that mass of the core layer 34:mass of the coating layer 36=99:1 to 75:25, and more preferably the mass of the core layer 34:the mass of the coating layer 36=98:2 to 80:20, approximately, are satisfied. The mass ratio mentioned above can be calculated by calculating the mass of each layer from a product of the density of the resin forming each layer and the volume of the resin forming each layer.

Incidentally, in general, when the expanded bead 30 having the through hole 32 or the multilayer expanded bead 31 having the through hole 32 (hereinafter also referred to as "expanded bead 30 or the like") is used, the shrinkage rate after the molding is higher than that of an expanded beads molded body (not illustrated) formed by expanded beads without through holes (hereinafter also referred to as conventional expanded beads molded body), and an amount of shrinkage is large. Accordingly, with respect to the seat core member 100, which may include a problem that the frame member 20 is curved by the influence of the molding shrinkage, the expanded beads molded body 10 formed by the expanded beads 30 or the like has been believed to be unsuitable. However, the present inventors have conducted an extensive study and found out that, when the expanded bead 30 or the like is used, the dimensional accuracy of the seat core member 100 can be rather improved. Although the reason why the expanded bead 30 or the like is suitable for the constituent material for the seat core member 100 is not clear, the following reason may be considered.

As a frame member, a material having a molding shrinkage ratio lower than that of the expanded beads molded body is commonly used. When the insert molding is carried out using such a frame member and the expanded beads without through holes, while shrinkage of the expanded beads molded body at a peripheral region of the frame member is prevented by the frame member, an integrally molded article seeks to shrink at regions other than the peripheral region of the frame member. Accordingly, it is considered that shrinkage force of the expanded beads molded body at the regions other than the peripheral region of the frame member significantly exceeds rigidity of the frame member, whereby the seat core member is curved after the molding and the dimensional accuracy of the seat core member is lowered.

In contrast, according to the present invention, the insert molding is carried out using expanded beads 30 or the like having through holes 32. In this case, since the predetermined voids are present in the expanded beads molded body, the shrinkage force generated in the expanded beads molded body at the regions other than the peripheral region of the frame member is relatively small. For that reason, it is considered that external force applied to the frame member is reduced, whereby the integrally molded article is made difficult to curve.

The expanded bead 30 having the through hole 32 can be manufactured using an appropriately selected publicly-known method of manufacturing the same. For example, first, a resin base material such as a polyolefin-based resin is subject to melt-kneading using an extruder, and then extruded in a tubular strand form. Then, the extrudate extruded as described above is cooled and cut to an appropriate length thereafter, or cut to an appropriate length and cooled thereafter, thereby producing the resin bead having the through hole 32. Here, the desired through hole can be formed in the resin bead by a slit in a specific shape provided at an outlet of the extruder for extruding the molten resin. Subsequently, the produced resin bead is impregnated with a foaming agent in a closed container. Thereafter, the resin bead containing the foaming agent is discharged from the closed container at an appropriate foaming temperature, thereby foaming the resin bead. As a result, the expanded bead 30 having the through hole can be manufactured.

The multilayer expanded bead 31 can be manufactured as exemplified below. Here, a method of producing the multilayer expanded bead 31 that includes the foamed core layer 34 formed of the polyolefin-based resin and the non-foamed coating layer 36 formed of the polyolefin-based resin having the melting temperature Ts (° C.) lower than the melting temperature Tc (° C.) of the polyolefin-based resin for forming the core layer 34 will be described as an example. Other methods of manufacturing or a method of manufacturing in which a part of the method of manufacturing to be described below is modified may be used to produce the multilayer expanded bead 31.

First, a multilayer resin bead that includes a non-foamed core layer and a non-foamed coating layer is manufactured as follows.

Two extruders, i.e., an extruder for forming a core layer and an extruder for forming a coating layer are coupled to a coextrusion die. A polyolefin-based resin for forming a core layer and an additive to be added as necessary are supplied into the extruder for forming a core layer, and are subject to melt-kneading. On the other hand, a polyolefin-based resin for forming a coating layer and an additive to be added as necessary are supplied into the extruder for forming a coating layer, and are subject to melt-kneading. Further, each of the melt-kneaded materials is joined in the coextrusion die to form a sheath-core composite that includes a tubular non-foamed core layer and a non-foamed coating layer coating an outer surface of the core layer. The composite is then extruded from a small hole of a nozzle attached along a tip of the extruder, and is cut to have a predetermined mass. As described above, the multilayer resin bead that includes the core layer formed of the tubular polyolefin-based resin and the coating layer formed of the polyolefin-based resin coating the core layer can be produced.

Subsequently, the multilayer resin beads produced as described above are dispersed in a dispersion medium inside a closed container such as an autoclave, and are heated to a temperature equal to or more than a softening temperature of the polyolefin-based resin for forming the core layer. Thereafter, the foaming agent is injected into the closed container to impregnate the multilayer resin bead with the foaming agent. One end of the closed container is then opened while pressure inside the closed container is maintained at the pressure equal to or more than the vapor pressure of the foaming agent, and the multilayer resin bead and the dispersion medium are simultaneously discharged into an atmosphere where the pressure thereof is lower than that inside the container. At this time, the multilayer resin bead foams. The foaming causes at least the core layer to be in a foamed state, thereby forming the foamed core layer (core layer 34). Such a method of foaming is hereinafter referred to as a method of dispersion medium discharge foaming. In this manner, the multilayer expanded bead 31 can be produced. When the method of dispersion medium discharge foaming is employed, an aqueous medium is commonly used as a dispersion medium.

In the method of dispersion medium discharge foaming described above, a dispersant is preferably added into the dispersion medium so that the multilayer expanded bead 31 heated in the container are not mutually fused. The dispersant is preferably used within a range of, for example, 0.001 parts by mass or more and 5 parts by mass or less per 100 parts by mass of the multilayer expanded bead 31.

Examples of the above-mentioned foaming agent include aliphatic hydrocarbons such as propane, butane, pentane, hexane, or heptane, alicyclic hydrocarbons such as cyclopentane or cyclohexane, organic physical foaming agents including halogenated hydrocarbons such as chlorofluoromethane, trifluoromethane, 1,2-difluoroethane, 1,2,2,2-tetrafluoroethane, methyl chloride, ethyl chloride, or methylene chloride, and what is called inorganic physical foaming agents such as nitrogen, oxygen, air, carbon dioxide, or water. The organic physical foaming agent and the inorganic physical foaming agent may be used in combination. Among these various physical foaming agents, those containing, as a main component, one or more inorganic physical foaming agents selected from the group consisting of nitrogen, oxygen, air, carbon dioxide, and water are preferable. When the method of dispersion medium discharge foaming is employed, an amount of the foaming agent to be added into the container is appropriately selected corresponding to a type of the foaming agent to be used, a foaming temperature, and an apparent density of the expanded beads to be produced. Specifically, when carbon dioxide is used as a foaming agent and water is used as a dispersion medium, for example, the foaming agent is preferably added such that pressure in the closed container (i.e. pressure in a space inside the closed container (gauge pressure)) in a stable state immediately before starting foaming is 0.6 MPa(G) or more and 6 MPa(G) or less. In general, it is preferable that the smaller the apparent density of the expanded bead to be produced is, the higher a value of the pressure in the space inside the closed container is adjusted to be. Moreover, in general, it is preferable that the larger the apparent density of the expanded bead to be produced is, the lower a value of the pressure in the space inside the closed container is adjusted to be.

In the method of dispersion medium discharge foaming described above, the coating layer 36 can be substantially in a non-foamed state using an appropriately selected publicly-known method. Specifically, for example, multilayer resin beads are prepared in such a manner that a nucleating agent (zinc borate, for example) is added to the resin for forming the core layer 34 in advance while the nucleating agent is not added to the resin for forming the coating layer 36 or an amount of the nucleating agent to be added thereto is reduced. The multilayer resin bead is foamed using the method of dispersion medium discharge foaming described above, whereby the multilayer expanded bead 31 that includes the foamed core layer 34 and the substantially non-foamed coating layer 36 can be manufactured.

From a viewpoint of a proper elasticity of the seat core member 100 in addition to the excellent strength and the impact resistance thereof being maintained, the apparent density of the expanded beads molded body 10 is preferably 10 kg/m$^3$ or more and 90 kg/m$^3$ or less. Particularly when the expanded beads molded body 10 is formed of the polyolefin-based resin, the above-mentioned apparent density is more preferably 20 kg/m$^3$ or more and 60 kg/m$^3$ or less. Incidentally, it is also possible to combine a plurality of expanded beads molded bodies having different apparent densities into one expanded beads molded body 10. In this case, the apparent density of each of the expanded beads molded bodies 10 having different apparent densities should at least be within the numerical range mentioned above.

The above-mentioned apparent density can be measured as follows.

From five or more spots randomly selected from the expanded beads molded body 10, cut samples in a predetermined dimension are cut out. The volume V (cm$^3$) of the cut samples is calculated, and also the mass (g) of the cut samples is measured. Then, M/V is calculated by dividing the mass M (g) of the cut sample by the volume V (cm$^3$) of the cut sample. The apparent density of the expanded beads molded body 10 can be defined by arithmetically averaging the M/V values calculated for the respective cut samples.

Next, the frame member 20 will be described. The frame member 20 is embedded in the expanded beads molded body 10 and reinforces the expanded beads molded body 10. Further, the frame member 20 supports other members provided on the seat core member 100 such as a rear latch 60 and a front latch 62.

The frame member 20 according to the present embodiment includes an annular outer frame 50. The outer frame 50 is embedded in the expanded beads molded body 10 along an outer edge of the expanded beads molded body 10 in a plan view. More specifically, as illustrated in FIG. 3A, the frame member 20 includes the outer frame 50 that includes outer edge parts 40, and a central frame 22. The rear latch 60 and the front latch 62 are welded at predetermined positions of the outer frame 50.

Note that the positions where the rear latch 60 and the front latch 62 are placed are not limited to the positions in the present embodiment, and can be appropriately positioned.

As understood from FIG. 1, the outer frame 50 is an annular part that includes the outer edge parts 40 extending along the outer edge of the expanded beads molded body 10 in a plan view. In the present embodiment, the outer frame 50 is a substantially square frame that includes the outer edge parts 40 and an exposed part 42 exposed from the expanded beads molded body 10. The outer edge parts 40 include a rear outer edge 40*a*, a front outer edge 40*b*, and side outer edges 40*c*. Examples of a variation (not illustrated) of the outer frame 50 include a configuration where the exposed part 42 is not provided, the outer edge parts 40 along the outer edge of the recess 120 illustrated in FIG. 1 are provided, and substantially the entire outer frame 50 is embedded in the expanded beads molded body 10 (substantially similar shape of the outer edge of the expanded beads molded body 10 in a plan view, for example).

That is, the frame member 20 according to the present embodiment includes the annular outer frame 50 that includes the outer edge parts 40 extending along the outer edge of the expanded beads molded body 10 in a plan view, and the outer frame 50 is embedded in the expanded beads molded body 10. Here, the annular shape of the outer frame 50 indicates both an aspect where the frame member included in the outer frame 50 is annularly formed in a seamless manner and an aspect where the frame member included in the outer frame 50 is annularly formed via other members. The seamless frame member indicates, in addition to one continuous frame member, a continuum of two or more frame members mutually joined at a predetermined position by welding or the like. Examples of the above-mentioned other members include, but are not limited to, a base 64 illustrated in FIG. 3B. In this manner, the outer shape of the seat core member 100 is reinforced. In order to dispose the frame member 20 including the annular part inside the seat core member 100, it is preferable that the insert molding is employed and the expanded beads molded body 10 and the frame member 20 are integrally molded. In the conventional art, the annular outer frame 50 including the outer edge parts 40 has tended to curve easily by the influence of particularly the molding shrinkage of the expanded beads molded body 10. In contrast, according to the present invention in which the expanded bead 30 or the like having a through hole is used, the influence of the shrinkage with respect to the frame member 20 can be reduced compared with a conventional seat core member, whereby the curvature of the outer frame 50 can be effectively inhibited.

Both end parts of the U-shaped rear latch 60 are welded and supported at predetermined positions on the rear outer edge 40*a*. As illustrated in FIG. 1, the rear latch 60 is partially exposed to the outside of the expanded beads molded body 10, and to be latched to a predetermined position of a vehicle in which the seat core member 100 is disposed. The rear latch 60 extends in a rearward direction of the seat core member 100. Likewise, both end parts of the U-shaped front latch 62 are welded and supported at predetermined positions on the front outer edge 40*b*. The front latch 62 extends downward from the seat core member 100, and the U-shaped part is exposed to the outside of the expanded beads molded body 10. In this manner, the rear latch 60 and/or the front latch 62 are provided, whereby the seat core member 100 can be easily installed and fixed to a predetermined position of the vehicle.

With the frame member 20 being curved, the positions of the rear latch 60 and/or the front latch 62 are displaced from intended positions when the seat core member 100 is installed in the vehicle. As a consequence, the seat core member 100 is difficult to latch to the predetermined position of the vehicle at times. In particular, the rear outer edge 40*a* and the front outer edge 40*b* are commonly embedded in thick regions of the expanded beads molded body 10, as described above. Accordingly, since these regions are easily influenced by the shrinkage of the expanded beads molded body 10, there has been a problem that the curvature easily occurs. In contrast, according to the present invention, the curvature of the frame member 20 is inhibited, whereby the rear latch 60 and/or the front latch 62 can be surely latched onto predetermined positions of the vehicle. Since the curvature of the frame member 20 at the thick regions thereof is inhibited, flexibility of design with respect to the expanded beads molded body 10 can be enhanced. In the present description, the term "thick" indicates a state where a thickness of the expanded beads molded body 10 in the up-down direction is relatively large.

As a variation, as illustrated in FIG. 3B, the base 64 wider than the diameter of the rear outer edge 40*a* may be used in such a manner that both ends of the rear latch 60 and the rear outer edge 40*a* are welded on a surface of the base 64, whereby the rear latch 60 can be supported more stably. The base 64 is, for example, a substantially rectangular plate body. The outer frame 50 may be annularly formed in such a manner that an arbitrary portion among the outer edge parts 40 is connected to an auxiliary member (base 64, for example). A material for forming the base 64 is not particularly limited, and examples thereof include a metal member and a resin member.

The frame member 20 according to the present embodiment includes the central frame 22 disposed inside the ring of the outer frame 50, and both end parts of the central frame are welded at predetermined positions of the outer frame 50. The central frame 22 extends, for example, in the front-rear direction of the seat core member 100.

Moreover, in order to more effectively inhibit the seat core member 100 from being curved due to the shrinkage of the expanded beads molded body 10, a space such as a slit or a cut (not illustrated) adjacent to the frame member 20 embedded in the expanded beads molded body 10 may be appropriately provided in the expanded beads molded body 10. This space can be formed on, for example, a side opposite to a side in a shrinkage direction of the expanded beads molded body 10 across the frame member 20 of the expanded beads molded body 10 while the shrinkage direction and a shrinkage amount of the expanded beads molded body 10 are calculated.

The frame member 20 commonly includes, for example, a metal member such as iron, aluminum, or copper, a resin member, or a ceramic member. In particular, the frame member 20 preferably includes the metal member in view of, for example, durability, strength, and heat resistance to heat at the time of molding the expanded beads molded body. It is more preferable that the frame member 20, in particular, is substantially formed of the metal member. As the above-mentioned metal member, a steel material is particularly preferable. The frame member 20 can be formed in such a manner that these members are subject to welding or bending.

The frame member 20 is preferably formed of an elongated member having a diameter of 2 mm or more and 8 mm or less, more preferably 3 mm or more and 7 mm or less, and particularly preferably 3.5 mm or more and 6 mm or less. A tensile strength of the above-mentioned elongated member is preferably 200 N/mm$^2$ or more. From a viewpoint of improving the strength of the seat core member 100, the above-mentioned tensile strength is more preferably 250 N/mm$^2$ or more and 1300 N/mm$^2$ or less. Moreover, a yield point of the elongated member is preferably 400 N/mm$^2$ or more, and more preferably 440 N/mm$^2$ or more. The elongated member having the diameter and the tensile strength within the above-mentioned numerical ranges is easily shaped into a predetermined shape, and the strength and lightness of the seat core member 100 can be maintained in an appropriate degree. In the conventional art, when such an elongated member having a small diameter is employed as the frame member 20, the curvature has tended to occur easily at the time of the molding shrinkage. In contrast, according to the present invention, the expanded bead 30 or the like having the through hole 32 is used, whereby the frame member 20 can be effectively inhibited from being curved while the lightness is maintained using such an elongated member having a small diameter.

The tensile strength of the elongated member can be measured in accordance with the method of measurement described in JIS G3532 SWM-B.

The above-mentioned elongated member is not a member having a particularly limited aspect ratio, and examples thereof include a linear body, a rod body, and a wire or tubular body formed by a plurality of linear bodies being gathered, which are made of the above-mentioned materials.

The seat core member 100 that is the integrally molded article using the expanded beads 30 and the frame member 20, as described above, is manufactured using the following method of in-mold molding, for example.

Specifically, the frame member 20 is disposed at a predetermined position inside a mold for molding the vehicle seat core member, and the mold is filled with the expanded beads 30 or the like. Subsequently, heated steam is introduced into the mold so that the expanded beads 30 or the like are heated and secondarily foamed, whereby the expanded beads 30 or the like are mutually fused. In this manner, the seat core member 100 that includes the expanded beads molded body 10 in which the frame member 20 is embedded is manufactured. The seat core member 100 manufactured in this manner is the integrally molded article of the expanded beads molded body 10 and the frame member 20, which is superior in terms of integrity of both components.

Second Embodiment

Figure 4:
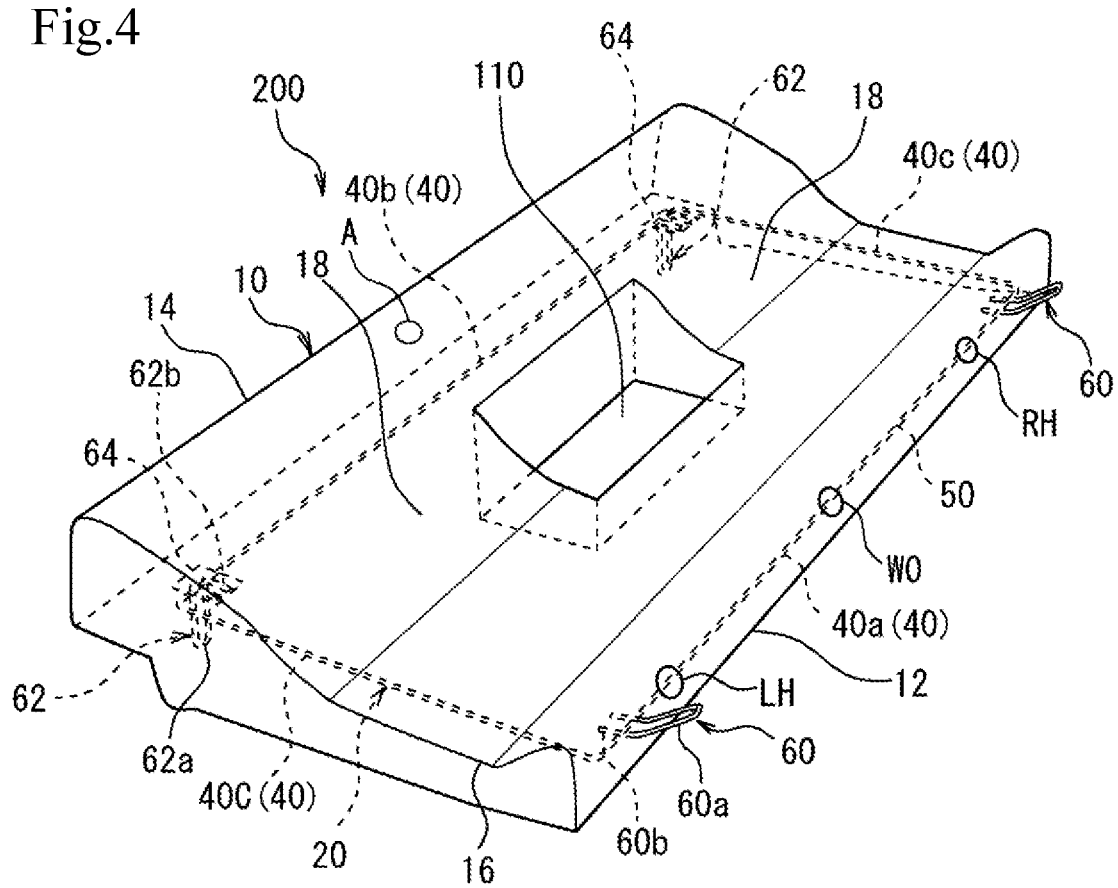
FIG. 4 is a schematic perspective view of a vehicle seat core member according to a second embodiment of the present invention.

Hereinafter, a vehicle seat core member according to a second embodiment of the present invention will be described with reference to FIG. 4. FIG. 4 is a schematic perspective view of a vehicle seat core member 200 (hereinafter also simply referred to as seat core member 200) according to the present embodiment. The seat core member 200 is, while shapes of an expanded beads molded body 10 and a frame member 20 are exemplified differently from those of the above-described seat core member 100, an integrally molded article of the expanded beads molded body 10 and the frame member 20 in a similar manner to that in the first embodiment. Descriptions of constituent materials, physical properties, methods of manufacturing, and the like of the expanded beads molded body 10 and the frame member 20 included in the seat core member 200 can refer to the descriptions with respect to the first embodiment, and are omitted here as appropriate.

The expanded beads molded body 10 according to the present embodiment is provided with a hole 110 penetrating in an up-down direction at substantially a center thereof in a plan view. Seat sections 18 are provided on left and right sides of the hole 110, respectively. A vicinity of the hole 110 also serves as the seat section 18. The outer frame 50 according to the present embodiment does not include an exposed part 42, and is formed by the outer edge parts 40. The outer frame 50 is entirely embedded in the expanded beads molded body 10.

The frame part 20 according to the present embodiment includes annular (substantially square) outer edge parts 40. The outer edge parts 40 include a rear outer edge 40*a*, a front outer edge 40*b*, and two side outer edges 40*c*. The rear outer edge 40*a* and the front outer edge 40*b* are elongated members disposed substantially in parallel. The two side outer edges 40*c* are also elongated members disposed substantially in parallel. A base 64 as a plate body is provided in the vicinity of both end parts of the front outer edge 40*b*.

A U-shaped front latch 62 is provided on a front side of the seat core member 200, and a U-shaped rear latch 60 is provided on a rear side of the seat core member 200.

The front latch 62 includes a U-shaped part 62a extending in the up-down direction and a bent part 62b bent relative to the U-shaped part 62a. The rear latch 60 includes a U-shaped part 60a and a bent part 60b bent relative to the U-shaped part 60a. The bent part 62b and the bent part 60b are at least partially embedded in the expanded beads molded body 10. The U-shaped part 62a and the U-shaped part 60a are at least partially exposed to the outside of the expanded beads molded body 10, and are capable of being latched to a predetermined position of a vehicle.

In the present embodiment, as illustrated in FIG. 4, the front outer edge 40b and the bent part 62b are welded on one surface (lower surface, for example) of the base 64. That is, a part (i.e. bent part 62b) of the front latch 62 is fixed to the base 64. Further, the front latch 62 is fixed to the frame part 20 via the base 64.

The bent part 60b of the rear latch 60 is directly welded at a predetermined position of the frame part 20. The U-shaped part 60a exposed to the outside of the expanded beads molded body 10 is inclined upward with respect to a rearward direction.

EXAMPLES

Examples using an expanded bead having a through hole and comparative examples using an expanded bead without a through hole were carried out as follows.

First Embodiment

A multilayer expanded bead used in Example 1 was prepared as follows.

An extruder equipped with an extruder for forming a core layer having an inner diameter of 65 mm and an extruder for forming an outer coating layer having an inner diameter of 30 mm, which is attached with a die for forming a multilayer strand at an outlet thereof, was prepared. With the extruder mentioned above having been employed, a polyolefin-based resin (polypropylene-based resin, melting temperature: 142° C.) for forming a core layer and a polyolefin-based resin (polypropylene-based resin, melting temperature: 125° C.) for forming a coating layer were supplied into the respective extruders and were subject to melt-kneading, whereby melt-kneaded materials were produced. Here, as a nucleating agent, zinc borate was added to the resin for forming the core layer. A master batch using the resin for forming the core layer as a resin base material was prepared and supplied into the extruder for forming a core layer. Content of the zinc borate was adjusted to 1000 ppm by mass.

The two types of melt-kneaded materials produced as described above were introduced into the die for forming a multilayer strand, joined in the die, and extruded as a cylindrical strand from a small hole of a nozzle attached to a tip of the die (core layer mass %:coating layer mass %=95:5). The extruded strand was water-cooled, cut with a pelletizer, and dried to produce cylindrical multilayer resin beads. The multilayer resin bead has a structure in which the coating layer and the non-foamed core layer are laminated (sheath-core shape), and a through hole is provided in the core layer.

In a closed container having a capacity of 5 L, 800 g of the multilayer resin beads prepared as described above and 3 L of water as a dispersion medium were charged. At this time, relative to 100 parts by mass of the multilayer resin beads, 0.3 parts by mass of kaoline as a dispersant, 0.4 parts by mass of sodium alkylbenzene sulfonate (trade name: NEOGEN (trademark), manufactured by DKS Co. Ltd.) as a surfactant, and 0.01 parts by mass of aluminum sulfate were added into the closed container. Then, carbon dioxide (3.4 MPa) as a foaming agent was injected into the closed container, contents inside the closed container were heated to a temperature 5° C. lower than the foaming temperature (146.5° C.) while being stirred, and the temperature was kept for 15 minutes to adjust the heat amount of the high-temperature peak.

Thereafter, the temperature was further increased up to the foaming temperature mentioned above, kept for 15 minutes again, an equilibrium vapor pressure was adjusted to 3.6 MPa. Subsequently, the contents inside the closed container were discharged together with water under atmospheric pressure. At this time, the core layer was foamed and a foamed core layer was formed. In addition, a substantially non-foamed coating layer for coating the foamed core layer was formed. In this manner, the multilayer expanded bead having a through hole was produced.

The produced multilayer expanded bead had a bulk density of 25.0 kg/m$^3$, an average particle mass of 1.5 mg, an average diameter of a through hole of 1.9 mm, and an average L/D of 0.8.

Example 1

A frame member having a configuration similar to that of the frame member 20 illustrated in FIG. 3 was formed of iron rod bodies having a tensile strength (JIS G3532 SWM-B) of 500 N/mm$^2$. Iron rod bodies having a diameter of 5 mm were used for front latches provided at three spots on a front side, and iron rod bodies having a diameter of 4.5 mm were used for other parts. Intersections of the iron rod bodies for forming the frame member 20 were joined by welding.

The frame member described above was placed in a mold (1330 mm in a longitudinal direction, 600 mm in a front-rear direction, and 225 mm in a maximum thickness) for molding a seat core member for an automobile. At this time, the frame member 20 was disposed in such a manner that the rear latches were disposed at two spots on the rear side of the seat core member to be molded, the front latches were disposed at three spots on the front side of the seat core member to be molded, and the front outer edge 40b was embedded at a height of 20 mm from a bottom surface of the expanded beads molded body. Then, after the mold was clamped, the mold was filled with the multilayer expanded beads produced as described above and heated by steam, whereby the seat core member having the shape illustrated in FIG. 1 was molded. This was defined as Example 1. Specifically, the steam heating and the like were carried out under the following conditions. That is, steam was supplied into the mold for four seconds in a state where drain valves of both sides of the mold were opened, whereby preheating (exhaust process) was carried out. Then, one-direction flow heating was carried out at a molding steam pressure of 0.14 MPa(G). Reversed one-direction flow heating was carried out at a molding steam pressure of 0.20 MPa(G) thereafter. Main heating was carried out from both directions at a molding steam pressure of 0.24 MPa(G) thereafter. After completion of the heating, the pressure was released, water-cooling was carried out for one second, and air-cooling was carried out for 20 seconds, whereby the seat core member was produced. After curing was carried out at 75° C. for 12 hours, gradual cooling was carried out for six hours to produce the seat core member, which was defined as the seat core member of Example 1. The expanded beads molded body included in the seat core member had an apparent density of 32 kg/m³ and a porosity of 20 vol %.

Comparative Example 1

A seat core member was molded in a similar manner to Example 1 except that a polypropylene-based resin expanded bead, which is not provided with a through hole, having a bulk density of 25.3 kg/m³, an average particle mass of 1.0 mg, and an average L/D of 1.0 was used as an expanded bead, and part of the molding conditions were changed as follows.

In Comparative Example 1, a molding steam pressure at the time of steam heating was set to 0.16 MPa(G) for one-direction flow heating, 0.26 MPa(G) for reversed one-direction flow heating, and 0.30 MPa(G) for main heating. Further, a water-cooling time was set to 120 seconds, and an air-cooling time was set to 10 seconds. The expanded beads molded body in the seat core member had an apparent density of 31 kg/m³. Furthermore, the molded body did not include voids communicating with the outside.

(Method of Measurement 1)

For each of the seat core members produced according to the above-described Example 1 and Comparative Example 1 (hereinafter also referred to as measurement sample), a plurality of spots indicated by circles illustrated in FIG. 1 (specifically, measurement spot RH and measurement spot LH) was selected as a spot for measuring a dimensional error amount. The dimensional error was measured using, as a displaced amount, a distance difference between the measurement spot on the measurement sample and a corresponding spot on a measurement gauge.

The measurement gauge was prepared in such a manner that a dimension thereof was 10 mm outward (upward in the up-down direction of the vehicle) from the outer shape of the seat core member having a target dimension, and that an aluminum plate was hollowed out into a shape over the entire front-rear direction of the seat core member including the measurement spots.

The measurement sample was fixed to a predetermined position on a predetermined base, and the measurement gauge was fixed in such a manner that an outer surface of the measurement sample was covered from above. In the present method of evaluation, measurement sample support parts were provided at a total of three positions in a front end of the seat core member, that is, ones in the vicinities of both end parts in a left-right direction, and one in the middle thereof. Likewise, the measurement sample support parts were provided at a total of three positions in a rear end of the seat core member, that is, ones in the vicinities of both end parts in the left-right direction, and one in the middle thereof. In this manner, the measurement sample was supported. The dimensional error relative to the target dimension was calculated using a spatial distance between the measurement spot on the measurement sample and the corresponding spot on the measurement gauge (in the up-down direction of the vehicle) being measured. Specifically, for example, when the spatial distance generated between the measurement sample and the measurement gauge is 10 mm, a dimensional error of the measurement sample relative to the target dimension can be evaluated as 0 mm.

With regard to the measurement spots, a central front end position of the body in a longitudinal direction was defined as a reference point A (see FIG. 1); a position 380 mm away from the reference point A toward a left side in a travelling direction and 460 mm away toward a rearward side in the travelling direction was defined as a measurement spot LH; and a position 380 mm away from the reference point A toward a right side in the travelling direction and 460 mm away toward a rearward side in the travelling direction was defined as a measurement spot RH. Each of the measurement points was located 65 mm away from a bottom surface toward an upper side in the up-down direction of the vehicle.

The result of the measurement of the dimensional error amount in each of the above-described measurement spots is shown in Table 1.

A measured value of a case where the dimension was shifted outward (upward in the up-down direction of the vehicle) from the target dimension was defined as plus, whereas a measured value of a case where the dimension was shifted inward (downward in the up-down direction of the vehicle) from the target dimension was defined as minus. The method of measuring the above-mentioned measured value was similarly applied to Examples 2 and 3 and Comparative Examples 2 and 3.

From the result of the measurement, it was confirmed that the dimensional error amount in Example 1 was smaller than that in Comparative Example 1, and the shrinkage or the curvature of the seat core member relative to the target dimension was reduced compared with a conventional case.

Example 2

Multilayer expanded beads to be used in Examples 2-1, 2-2, and 2-3 were prepared in a similar manner to Example 1, and seat core members having the shape illustrated in FIG. 1 were molded.

Example 2-1

A seat core member was manufactured in the similar manner to Example 1 except that the apparent density and the porosity of the expanded beads molded body included in the seat core member were changed to those shown in Table 2, which was defined as Example 2-1.

Example 2-2

A seat core member was manufactured in the similar manner to Example 1 except that the apparent density and the porosity of the expanded beads molded body included in the seat core member were changed to those shown in Table 2, which was defined as Example 2-2.

Example 2-3

A seat core member was manufactured in the similar manner to Example 1 except that the apparent density and the porosity of the expanded beads molded body included in the seat core member were changed to those shown in Table 2, which was defined as Example 2-3.

Comparative Example 2

A seat core member was manufactured in a similar manner to Comparative Example 1 except that the apparent density of the expanded beads molded body included in the seat core member was changed to that shown in Table 2, which was defined as Comparative Example 2.

(Method of Measurement 2)

In Example 2 and Comparative Example 2, the measurement sample support parts erecting on the base substantially vertically were provided at a total of three positions in the front end of the seat core member, that is, ones in the vicinities of both end parts in the left-right direction, and one in the middle thereof. Further, the measurement sample support parts were provided at a total of two positions in the rear end of the seat core member, that is, ones in the vicinities of both end parts in the left-right direction. Still further, the measurement sample support parts were provided at a total of two positions in left and right ends of the seat core member, that is, ones in the vicinities of respective central parts in the front-rear direction. Except for the above, the dimensional error was measured in a similar manner to Method of Measurement 1.

The results of the measurement of the dimensional error amount in each of the above-described measurement spots are shown in Table 2.

In Example 2 and Comparative Example 2, the method of supporting the measurement sample was changed to a condition different from Method of Measurement 1. Under such a changed condition as well, it was confirmed that the dimensional error amounts at the measurement spot RH and the measurement spot LH in Examples 2-1, 2-2, and 2-3 were reduced in a well-balanced manner. Meanwhile, the dimensional error amount at the measurement spot RH in Comparative Example 2 significantly exceeded 3 mm.

Second Embodiment

Example 3

A multilayer resin bead used in Example 3 was prepared in the similar manner to Example 1 except that the conditions for manufacturing the multilayer expanded bead were changed as follows.

An extruder equipped with an extruder for forming a core layer having an inner diameter of 50 mm and an extruder for forming an outer coating layer having an inner diameter of 30 mm, which is attached with a die for forming a multilayer strand at an outlet thereof, was used. As the polyolefin-based resin for forming the core layer, a polypropylene-based resin having a melting temperature of 153° C. was used. As the polyolefin-based resin for forming the coating layer, a polyethylene-based resin having a melting temperature of 102° C. was used.

In a closed container having a capacity of 400 L, 5000 g of the multilayer resin beads prepared as described above and 325 L of water as a dispersion medium were charged. At this time, relative to 100 parts by mass of the multilayer resin beads, 0.06 parts by mass of kaoline as a dispersant, 0.01 parts by mass (as an active ingredient) of sodium alkylbenzene sulfonate (trade name: NEOGEN (trademark), manufactured by DKS Co. Ltd.) as a surfactant, and 0.0002 parts by mass of aluminum sulfate were added into the closed container. Then, carbon dioxide (2.4 MPa) as a foaming agent was injected into the closed container, contents inside the closed container were heated to a temperature 0.5° C. lower than the foaming temperature (157.0° C.) while being stirred, and the temperature was kept for six minutes to adjust the heat amount of the high-temperature peak.

Thereafter, the temperature was further increased up to the foaming temperature mentioned above, kept for six minutes again, an equilibrium vapor pressure was adjusted to 3.6 MPa. Subsequently, the contents inside the closed container were discharged together with water under atmospheric pressure. At this time, the core layer was foamed and a foamed core layer was formed. In addition, a substantially non-foamed coating layer for coating the foamed core layer was formed. In this manner, the multilayer expanded bead having a through hole was produced.

The produced multilayer expanded bead had a bulk density of 27.0 kg/m$^3$, an average particle mass of 1.5 mg, an average diameter of a through hole of 2.3 mm, and an average L/D of 1.0.

A frame member having a configuration similar to that of the frame member 20 illustrated in FIG. 4 was formed of iron rod bodies having a tensile strength (JIS G3532 SWM-B) of 500 N/mm$^2$. Iron rod bodies having a diameter of 5 mm were used for front latches provided at two spots on the front side, and iron rod bodies having a diameter of 4.5 mm were used for other parts. Intersections of the iron rod bodies for forming the frame member 20 were joined by welding.

The frame member described above was placed in the mold (1200 mm in the longitudinal direction, 600 mm in the front-rear direction, and 280 mm in the maximum thickness) for molding a seat core member for an automobile. At this time, the frame member 20 was disposed in such a manner that the rear latches were disposed at two spots on the rear side of the seat core member to be molded, the front latches were disposed at two spots on the front side of the seat core member to be molded, and the front outer edge 40b was embedded at a height of 20 mm from the bottom surface of the expanded beads molded body. Then, after the mold was clamped, the mold was filled with the multilayer expanded beads produced as described above and heated by steam, whereby the seat core member having the shape illustrated in FIG. 4 was molded. This was defined as Example 3. Specifically, the steam heating and the like were carried out under the following conditions. That is, steam was supplied into the mold for four seconds in a state where drain valves of both sides of the mold were opened, whereby preheating (exhaust process) was carried out. Then, the one-direction flow heating was carried out at a molding steam pressure of 0.07 MPa(G). The reversed one-direction flow heating was carried out at a molding steam pressure of 0.11 MPa(G) thereafter. The main heating was carried out from both directions at a molding steam pressure of 0.15 MPa(G) thereafter. After completion of the heating, the pressure was released, the water-cooling was carried out for 60 seconds, and the air-cooling was carried out for 15 seconds, whereby the seat core member was produced. After the curing was carried out at 75° C. for 12 hours, the gradual cooling was carried out for six hours to produce the seat core member, which was defined as the seat core member of Example 3. The expanded beads molded body in the seat core member had an apparent density of 27 kg/m$^3$ and a porosity of 25 vol %.

Comparative Example 3

A seat core member was molded in a similar manner to Example 3 except that the polypropylene-based resin expanded bead used in Comparative Example 1 was used as an expanded bead, and part of the molding conditions were changed as follows.

In Comparative Example 3, the molding steam pressure at the time of the steam heating was set to 0.14 MPa (G) for the one-direction flow heating, 0.24 MPa (G) for the reversed one-direction flow heating, and 0.30 MPa (G) for the main heating. Further, a water-cooling time was set to 10 seconds. The expanded beads molded body in the seat core member had an apparent density of 28 kg/m$^3$. Furthermore, the molded body did not include voids communicating with the outside.

(Method of Measurement 3)

In Example 3 and Comparative Example 3, the measurement sample support parts were provided at a total of three positions in the front end of the seat core member, that is, ones in the vicinities of both end parts in the left-right direction, and one in the middle thereof. Likewise, the measurement sample support parts were provided at a total of three positions in the rear end of the seat core member, that is, ones in the vicinities of both end parts in the left-right direction, and one in the middle thereof. Further, with regard to the measurement spots, the central front end position of the body in the longitudinal direction was defined as the reference point A (see FIG. 4), and a position 500 mm away from the reference point A toward the rearward side in the travelling direction was defined as a measurement spot WO. Furthermore, a position 350 mm away from the measurement spot WO toward the left side in the travelling direction was defined as the measurement spot LH, and a position 350 mm away from the measurement spot WO toward the right side in the travelling direction was defined as the measurement spot RH. Each of the measurement points was located 100 mm away from the bottom surface toward the upper side in the up-down direction of the vehicle. Under the measurement conditions similar to those in Method of Measurement 1 other than the above, dimensional error amounts in Example 3 and Comparative Example 3 were measured.

The results of the measurement of the dimensional error amount in each of the above-described measurement spots, with respect to Example 3 and Comparative Example 3, are shown in Table 3.

In Example 3 and Comparative Example 3, the shape of the seat core member was changed from those in Examples 1 and 2 and Comparative Examples 1 and 2 according to the first embodiment. Even when such a change was made, it was confirmed that the dimensional error amount in Example 3 was significantly reduced compared with that in Comparative Example 3.

As a result of the measurements described above, the dimensional error amounts at the measurement spot LH and the measurement spot RH (and also the measurement spot WO in Example 3) in all Examples were reduced in a well-balanced manner relative to those in Comparative Examples.

TABLE 1

| Measurement Spot | | Example 1 | Comparative Example 1 |
|---|---|---|---|
| Dimensional Error Amount (mm) | RH | Plus 0.9 | Plus 2.2 |
| | LH | Plus 0.6 | Plus 1.6 |

TABLE 2

| | | Example 2-1 | Example 2-2 | Example 2-3 | Comparative Example 2 |
|---|---|---|---|---|---|
| Apparent Density ($kg/m^3$) | | 29 | 27 | 41 | 28 |
| Porosity (vol %) | | 36 | 10 | 26 | 0 |
| Dimensional Error Amount (mm) | RH | Minus 1.3 | Plus 0.6 | Plus 1.5 | Plus 3.5 |
| | LH | Minus 1.9 | Minus 1.3 | Plus 0.8 | Minus 0.4 |

TABLE 3

| | | Example 3 | Comparative Example 3 |
|---|---|---|---|
| Apparent Density ($kg/m^3$) | | 27 | 28 |
| Porosity (vol %) | | 25 | 0 |
| Dimensional Error Amount (mm) | RH | Minus 3.0 | Minus 8.0 |
| | WO | Minus 2.6 | Minus 9.0 |
| | LH | Minus 2.6 | Minus 7.5 |

The embodiments described above include the following technical idea.

(1) A vehicle seat core member includes: a thermoplastic resin expanded beads molded body; and a frame member, the vehicle core seat member being an integrally molded article of the thermoplastic resin expanded beads molded body and the frame member, wherein The thermoplastic resin expanded beads molded body is formed of an expanded beads molded body in which thermoplastic resin beads having through holes are mutually fused, the expanded beads molded body includes voids, and a porosity of the thermoplastic resin expanded beads molded body is 10 vol % or more and 40 vol % or less.

(2) The vehicle seat core member according to (1) described above, wherein an apparent density of the thermoplastic resin expanded beads molded body is 10 $kg/m^3$ or more and 90 $kg/m^3$ or less.

(3) The vehicle seat core member according to (1) or (2) described above, wherein the frame member includes a metal member.

(4) The vehicle seat core member according to any one of (1) to (3) described above, wherein the frame member has a diameter of 2 mm or more and 8 mm or less, and the frame member is formed of a member having a tensile strength of 200 $N/mm^2$ or more.

(5) The vehicle core seat member according to any one of (1) to (4) described above, wherein the frame member includes an annular outer frame, and the outer frame is embedded in the thermoplastic resin expanded beads molded body along an outer edge of the thermoplastic resin expanded beads molded body in a plan view.

(6) The vehicle seat core member according to any one of (1) to (5) described above, wherein a thermoplastic resin forming the thermoplastic resin expanded beads molded body includes a polyolefin-based resin.

(7) The vehicle core seat member according to any one of (1) to (6), wherein the thermoplastic resin expanded bead is a multilayer expanded bead that includes a tubular polyolefin-based resin foamed core layer and a polyolefin-based resin coating layer coating the polyolefin-based resin foamed core layer, and a melting temperature of a resin forming the polyolefin-based resin coating layer is lower than a melting temperature of a resin forming the polyolefin-based resin foamed core layer.

(8) The vehicle seat core member according to (7) described above, wherein a melting temperature Ts (° C.) of the resin forming the polyolefin-based resin coating layer is lower than a melting temperature Tc (° C.) of the resin forming the polyolefin-based resin foamed core layer by at least 15° C.

This application claims the benefit of priority of Japanese Patent Application No. 2016-020035, filed on Feb. 4, 2016, the disclosure of which is entirely incorporated herein.

REFERENCE SIGNS LIST 10 thermoplastic resin expanded beads molded body
12 rear end
14 front end
16 middle part
18 seat section
20 frame member
22 central frame
30 thermoplastic resin expanded bead
31 multilayer expanded bead
32 through hole
34 thermoplastic resin foamed core layer
36 thermoplastic resin coating layer
40 outer edge part
40a rear outer edge
40b front outer edge
40c side outer edge
42 exposed part
50 outer frame
60 rear latch
60a, 62a U-shaped part
60b, 62b bent part
62 front latch
64 base
100, 200 vehicle seat core member
110 hole
120 recess
A reference point
RH, LH, WO Measurement Spot

The invention claimed is:

1. A vehicle seat core member, comprising:
a thermoplastic resin expanded beads molded body; and
a frame member,
the vehicle seat core member being an integrally molded article of the thermoplastic resin expanded beads molded body and the frame member, wherein
the thermoplastic resin expanded beads molded body is formed of an expanded beads molded body in which thermoplastic resin expanded beads having through holes are mutually fused,
the expanded beads molded body includes voids,
a porosity of the thermoplastic resin expanded beads molded body is 10 vol % or more and 40 vol % or less, and
the frame member is formed of a member selected from a metal member, non-foamed resin, and a ceramic member.

2. The vehicle seat core member according to claim 1, wherein an apparent density of the thermoplastic resin expanded beads molded body is 10 kg/m$^3$ or more and 90 kg/m$^3$ or less.

3. The vehicle seat core member according to claim 1, wherein the frame member includes a metal member.

4. The vehicle seat core member according to claim 1, wherein the frame member has a diameter of 2 mm or more and 8 mm or less, and the frame member is formed of a member having a tensile strength of 200 N/mm$^2$ or more.

5. The vehicle seat core member according to claim 1, wherein the frame member includes an annular outer frame, and the outer frame is embedded in the thermoplastic resin expanded beads molded body along an outer edge of the thermoplastic resin expanded beads molded body in a plan view.

6. The vehicle seat core member according to claim 1, wherein a thermoplastic resin forming the thermoplastic resin expanded beads molded body includes a polyolefin-based resin.

7. The vehicle seat core member according to claim 1, wherein the thermoplastic resin expanded bead is a multilayer expanded bead that includes a tubular polyolefin-based resin foamed core layer and a polyolefin-based resin coating layer coating the polyolefin-based resin foamed core layer, and
a melting temperature of a resin forming the polyolefin-based resin coating layer is lower than a melting temperature of a resin forming the polyolefin-based resin foamed core layer.

8. The vehicle seat core member according to claim 7, wherein a melting temperature Ts (° C.) of the resin forming the polyolefin-based resin coating layer is lower than a melting temperature Tc (° C.) of the resin forming the polyolefin-based resin foamed core layer by at least 15° C.

9. The vehicle seat core member according to claim 1, wherein the frame member is formed of an elongated member selected from a rod body and a wire body.

10. The vehicle seat core member according to claim 1, wherein a thick region is provided in the vicinity of a front end of the thermoplastic resin expanded beads molded body, and a part of the frame member is embedded in the thick region and extended in the left-right direction of the vehicle seat core member.

* * * * *